United States Patent [19]

Wingler et al.

[11] Patent Number: 4,533,397
[45] Date of Patent: Aug. 6, 1985

[54] USE OF POLYMER ALLOYS BASED ON CELLULOSE ESTERS IN CONTACT OPHTHALMICS, AND CONTACT LENSES PRODUCED FROM THE POLYMER ALLOYS

[75] Inventors: Frank Wingler, Leverkusen; Helmut Waniczek, Cologne; Otto-Christian Geyer, Wetzlar, all of Fed. Rep. of Germany

[73] Assignee: Bayer Aktiengesellschaft, Leverkusen, Fed. Rep. of Germany

[21] Appl. No.: 598,178

[22] Filed: Apr. 9, 1984

[30] Foreign Application Priority Data

Apr. 19, 1983 [DE] Fed. Rep. of Germany ....... 3314188

[51] Int. Cl.$^3$ .......................... C08L 1/08; C08L 1/14
[52] U.S. Cl. .................................. 106/181; 523/106; 524/37; 524/38; 524/39
[58] Field of Search .................. 523/106; 106/181; 524/39, 37, 38

[56] References Cited

U.S. PATENT DOCUMENTS

| | | | |
|---|---|---|---|
| 4,008,191 | 2/1977 | Jagur-Grodzinski | 525/411 |
| 4,073,754 | 2/1978 | Cabasso et al. | 524/39 |
| 4,111,535 | 9/1978 | Loshaek et al. | 536/58 |
| 4,193,897 | 3/1980 | Wingler et al. | 524/40 |
| 4,231,905 | 11/1980 | Neefe | 523/106 |
| 4,379,864 | 4/1983 | Gallop et al. | 523/106 |

*Primary Examiner*—Theodore Morris
*Attorney, Agent, or Firm*—Connolly and Hutz

[57] ABSTRACT

Contact lenses prepared from a polymer alloy essentially free from low molecular weight plasticizers and which comprises
(A) 97–80% by weight of one or more cellulose esters of one or more aliphatic carboxylic acids, and
(B) 3–30% by weight of an aliphatic polymeric compound having ester moieties, carbonate moieties or both ester and carbonate moieties in the polymer chain and having an average molecular weight of 2,000 to 300,000, with less than 2% by weight of compounds having a molecular weight below 500.

9 Claims, No Drawings

USE OF POLYMER ALLOYS BASED ON CELLULOSE ESTERS IN CONTACT OPHTHALMICS, AND CONTACT LENSES PRODUCED FROM THE POLYMER ALLOYS

BACKGROUND OF THE INVENTION

The invention relates to contact lenses for the eye which are made of thermoplastic alloys of cellulose esters of aliphatic carboxylic acids and higher molecular weight aliphatic compounds with ester and/or carbonate groups in the polymer chain, the alloys being essentially free from low molecular weight plasticisers. The invention furthermore relates to the use of such polymer alloys for the production of refracting, semi-hard materials which absorb only small amounts of water, for contact optics.

A number of different plastics are already used in contact ophthalmics. The materials sit directly on the cornea and therefore substantially influence the metabolic processes thereof and the oxygen balance. In addition, irritation effects, for example by contamination and migrating constituents from the plastic, may occur on the eye as a result of the direct contact.

Contact lenses are generally classified into three main types, that is to say into hard, semi-hard and hydrophilic soft lenses. Lenses of the first type have been known for many years and are usually produced from polymethyl methacrylate, which can be cut and polished so that the lenses have good optical properties. However, in practice, hard polymethyl methacrylate lenses have the disadvantage of mechanical irritation to the cornea and the inside of the eyelid. If a patient is to wear hard lenses, this therefore necessitates a considerable acclimatisation period, during which the patient wears the lenses in gradually increasing periods of time, until a maximum period of continuous wear of about eight hours is achieved.

Because of this deficiency of the hard lenses, they are used by only a small percentage of wearers of contact lenses.

Soft contact lenses consisting of hydrogels of hydrophilic polymers have in recent years been introduced into contact ophthalmics. With these lenses, it has been possible to overcome the problem of eye irritation to a great extent, so that patients now become much more quickly accustomed to wearing contact lenses. Although the soft hydrophilic lens materials hitherto used, which are based on hydroxyethyl methacrylate and/or vinylpyrrolidone, initially are more comfortable to wear than hard lenses because of their hydrophilic character, they have the enormous disadvantage that metabolism products are deposited in them, and in addition bacteria, spores or fungi can penetrate and cause an infection of the eye.

There was therefore a need for new refracting materials for contact lenses for the eye, which have neither the disadvantage of deficient comfort during wear of the hard polymethyl methacrylate (PMMA) lens nor the disadvantage of the soft hydrogels based on hydroxyethyl methacrylate (HEMA)/vinylpyrrolidone of easily causing infection. The use of semi-hard materials which absorb only small amounts of water, cause no irritation symptoms, are chemically inert, are very comfortable to wear, accommodate no bacteria, fungi or metabolism products, release no plasticisers and the like and at the same time exhibit only slight light scattering, would be advantageous.

Cellulose acetobutyrate (CAB) is employed as the base material in the semi-hard lenses at present used in practice. The tolerance of CAB lenses is generally better than that of polymethyl methacrylate hard lenses. The reason for this is the better wettability, lower mechanical stress and higher heat conductivity of the CAB lenses. In addition, the transportation of lachrymal fluid is not so greatly inhibited under a hard to semi-hard lens as with a closely fitting soft lens. However, a disadvantage of the CAB lenses is that the materials frequently contain plasticisers and processing auxiliaries, since CAB cannot be processed as a thermoplastic without additives.

Semi-hard to soft materials which substantially fulfil the above requirements have been found in polymer alloys of cellulose esters and polyethylene/co-vinyl acetate (in this context, see DOS (German Published Specification) No. 2,807,663, DOS (German Published Specification) No. 2,856,891 and European Pat. No. 0,013,366). However, it has been found that the radii of contact lenses made of such materials may change after prolonged wear; moreover, such materials have a residual content of scattered light, although low, which is to be attributed to distribution of the alloy constituents not being completely homogeneous.

A. The object of the present invention was therefore to discover thermoplastic polymer alloys based on cellulose esters which have comfort in waring which is recognised as good, and the high level of inertness towards bacteria, fungi, metabolism products and the like of the cellulose esterpolyethylene/co-vinyl acetate polymer alloys, but have a smaller residual content of scattered light and give contact lenses with improved stability of radius. Such suitable materials have been found in thermoplastic polymer alloys, which are free from low molecular weight plasticisers, of cellulose esters and certain higher molecular weight aliphatic compounds.

B. The present invention thus relates to contact lenses of an essentially plasticiser-free polymer alloy based on one or more cellulose esters of one or more aliphatic carboxylic acids, which are characterised in that the polymer alloy consists of (A) 97 to 70% by weight, preferably 95 to 85% by weight, of cellulose esters and (B) 3 to 30% by weight, preferably 5 to 15% by weight, of an aliphatic polymeric compound with ester and/or carbonate groups in the polymer chain and a molecular weight of 2,000 to 300,000, preferably 4,000 to 200,000 and particularly preferably 5,000 to 100,000, and contains less than 2% by weight, preferably less than 1% by weight and particularly preferably less than 0.5% by weight, of compounds with a molecular weight below 500, preferably below 1,000. The molecular weights referred to above are number average values (Mn) determined by the gel permeation chromotography.

The semi-hard to soft polymer alloys to be used according to the invention are free from conventional plasticisers and processing stabilisers, without which cellulose esters of aliphatic carboxylic acids usually cannot be processed as thermoplastics without decomposition or discoloration. They are highly transparent to light and have only a very low content of scattered light. It is surprising that, in the mixtures to be employed according to the invention, the two polymers of different refractive index are compatible and no light scattering is exhibited. Incompatibilities and thus cloudiness usually occur with such polymer mixtures.

Cellulose esters which are suitable for the production of the refractive polymer alloys to be used according to the invention are cellulose esters of aliphatic carboxylic acids with 1 to 5 C atoms, preferably cellulose acetate, acetopropionate and acetobutyrate.

Processes for the production of organic cellulose esters have been known for a long time and are described, for example, in Ullmanns Encyclopädie der technischen Chemie (Ullmann's Encyclopaedia of Industrial Chemistry) (Verlag Urban und Schwarzenberg, Munich-Berlin, 1963) in Volume 5 on pages 182 to 201.

Suitable cellulose acetobutyrates contain, for example, 30 to 50% by weight of butyric acid, 10 to 26% by weight of acetic acid and 0.7 to 1.95% by weight of hydroxyl groups.

The use of cellulose acetobutyrates having the following composition is preferred: 35 to 46% by weight of butyric acid, 15 to 21% by weight of acetic acid and 0.8 to 1.7% by weight of hydroxyl groups.

Suitable cellulose acetopropionates contain, for example, 30 to 63.5% by weight of propionic acid, 1 to 12% by weight of acetic acid and 1.2 to 1.95% by weight of hydroxyl groups.

Cellulose acetopropionates having the following composition are preferably used according to the invention: 40 to 60% by weight of propionic acid, 2 to 8% by weight of acetic acid and 1.5 to 1.8% by weight of hydroxyl groups.

The relative viscosities ($\eta_{rel}$) of 2% strength solutions, in acetone at 25° C., of the aliphatic cellulose esters used are preferably between 3.5 and 5.0, particularly preferably between 4.0 and 4.5.

Higher molecular weight aliphatic compounds, which cannot be extracted with water, are optionally branched and optionally contain 2 to 8, preferably 2 or 3, and particularly preferably 2, terminal hydroxyl groups, and which generally contain carbonate and/or ester groups and optionally contain ether groups and have an average molecular weight (number-average) of 2,000 to 300,000, are suitable as the second component of the polymer alloys to be used according to the invention. These are preferably polyesters, polyether-esters, polyester-carbonates, polyether-carbonates and polyester-ether-carbonates.

Examples of suitable polyesters are reaction products of polyhydric, preferably dihydric and optionally also trihydric, alcohols with polybasic, preferably dibasic, carboxylic acids. Instead of the free polycarboxylic acids, it is also possible to use the corresponding polycarboxylic acid anhydrides or corresponding polycarboxylic acid esters of lower alcohols or mixtures thereof for the preparation of the polyesters. The polycarboxylic acids can be of aliphatic and/or cycloaliphatic nature and can optionally be substituted, for example by halogen atoms, and/or unsaturated.

Examples of such carboxylic acids and derivatives thereof which may be mentioned are: succinic acid, adipic acid, suberic acid, azelaic acid, sebacic acid, hexahydrophthalic anhydride, endomethylenetetrahydrophthalic anhydride, glutaric anhydride, maleic acid, maleic anhydride, fumaric acid and dimerised and trimerised unsaturated fatty acids, optionally as mixtures with monomeric unsaturated fatty acids, such as oleic acid. Examples of suitable polyhydric alcohols are ethylene glycol, propylene 1,2-glycol and 1,3-glycol, butylene 1,4-glycol and 2,3-glycol, hexane-1,6-diol, octane-1,8-diol, neopentyl-glycol, 1,4-bis-hydroxymethylcyclohexane, 2-methyl-propane-1,3-diol, glycerol, trimethylolpropane, hexane-1,2,6-triol, butane-1,2,4-triol, trimethylolethane, pentaerythritol, quinitol, mannitol and sorbitol, formitol, methyl glycoside and also diethylene glycol, triethylene glycol, tetraethylene glycol and higher polyethylene glycols, dipropylene glycol and higher polypropylene glycols and dibutylene glycol and higher polybutylene glycols. The polyesters can contain a proportion of terminal carboxyl groups. Polyesters obtained from lactones, for example ε-caprolactone, or from hydroxycarboxylic acids, for example ω-hydroxycaproic acid, can also be used.

The polyesters preferably have a molecular weight of 2,000 to 15,000 particularly preferably 4,000 to 12,000.

Components which can be incorporated into polyester-ethers and polyether-carbonates to be used according to the invention are optionally branched polyethers, of the type which is known per se, which can be prepared, for example, by self-polymerisation of epoxides, such as ethylene oxide, propylene oxide, butylene oxide, tetrahydrofuran or epichlorohydrin, for example in the presence of Lewis catalysts, such as $BF_3$, or by addition of these epoxides, preferably of ethylene oxide and propylene oxide, optionally as a mixture or successively, onto starting components with reactive hydrogen atoms, such as water, alcohols, ammonia or amines, for example ethylene glycol, propylene 1,3-glycol or 1,2-glycol, trimethylolpropane, glycerol, sorbitol, ethanolamine or ethylenediamine. Sucrose polyethers, such as are described, for example, in DE Auslegeschriften, (German Published Specifications) Nos. 1,176,358 and 1,064,938, and polyethers started on formitol or formose (DE-Offenlegungsschriften) (German Published Specifications) Nos. 2,639,083 and 2,737,951) are also suitable. Those polyethers which contain predominantly (up to 90% by weight, based on all the OH groups present in the polyether) primary OH groups are frequently preferred.

Polycarbonates which contain hydroxyl groups and which can be prepared, for example, by reacting diols, such as propane-1,3-diol, butane-1,4-diol and/or hexane-1,6-diol, diethylene glycol, triethylene glycol, tetraethylene glycol or thiodiglycol, with diaryl carbonates, for example diphenyl carbonate, or phosgene (DE-Auslegeschriften (German Published Specifications) Nos. 1,694,080, 1,915,908 and 2,221,751; and DE-Offenlegungsschrift (German Published Specification) No. 2,605,024), are also suitable according to the invention.

The polyester-amides and polyamides include, for example, the predominantly linear condensates obtained from polybasic saturated or unsaturated carboxylic acids or anhydrides thereof and polyhydric saturated or unsaturated aminoalcohols or mixtures thereof with diamines or polyamines.

The higher molecular weight compounds preferably employed according to the invention include condensation products which are obtained by etherification of polyhydroxy compounds, optionally of different polyhydroxy compounds, of average molecular weight of the type described above (for example a mixture of a polyester-polyol and a polyether-polyol) in the presence of a strong acid (see, for example, DE-OS (German Published Specification) No. 2,210,839, DE-OS (German Published Specification) No. 2,544,195 and U.S. Pat. No. 3,849,515). In compounds of this type, individual segments of average molecular weight are bonded to one another via ether bridges.

Compounds which are particularly preferred as the second component of the polymer alloys to be used according to the invention are aliphatic polyester- and/or polyether-carbonates which contain recurring structural units of the following general formula (I):

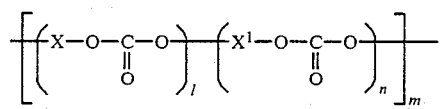

wherein
the radicals $X^1$ denote identical or different aliphatic polyester radicals with a molecular weight of 200 to 6,000, preferably 750 to 3,500 and particularly preferably 1,000 to 2,500, the radicals X have the meaning of $X^1$ or represent identical or different aliphatic polyether radicals with a molecular weight of 200 to 20,000, preferably 700 to 10,000 and particularly preferably 1,000 to 3,000, n=0 or is an integer from 1 to 20, l represents an integer from 1 to 20 and m denotes an integer, and preferably =20, the limiting viscosity [η] in tetrahydrofuran preferably being 0.5–2.5 (dl/g), particularly preferably 0.8–1.5.

Compounds of the formula (I) in which X denotes the radical of an aliphatic polyether with a molecular weight of 200 to 6,000 and n and l represent integers from 10 to 20, are suitable for the production of transparent lenses of particularly stable radius.

In order to ensure optimum transparency of the material to light, the content of polyester segments in the compound of the formula (I) should preferably be less than 50% by weight in the case of cellulose acetate; in contrast, both X and $X^1$ can represent a polyester radical in the case of cellulose acetobutyrate.

In principle, suitable polyester and polyether radicals X and $X^1$ are all those based on the polyesters and polyethers described above.

Preferred possible polyhydric aliphatic alcohols for the polyesters on which the radical $X^1$ is based are, optionally as mixtures with one another, for example, ethylene glycol, propylene 1,2-glycol and 1,3-glycol, butylene 1,4-glycol and 2,3-glycol, hexane-1,6-diol, octane-1,8-diol, neopentylglycol, 1,4-bis-(hydroxymethylcyclohexane), 2-methyl-propane-1,3-diol, di-, tri-, tetra- and poly-ethylene glycol, di-, tri-, tetra- and poly-propylene glycol and dibutylene glycol. Mixtures of two of these alcohols are preferred, one of the alcohols particularly preferably having a branched structure. Examples of these are ethylene glycol/butanediol and hexanediol/neopentylglycol.

Preferred possible polybasic aliphatic carboxylic acids for the polyesters on which the radical $X^1$ is based are dibasic aliphatic carboxylic acids, such as, for example, oxalic acid, malonic acid, succinic acid, adipic acid, suberic acid, azelaic acid, sebacic acid, hexahydrophthalic acid, glutaric acid and mixtures thereof. Instead of the free carboxylic acids, it is also possible to use their anhydrides or esters with lower alcohols. Adipic acid polyesters are preferred.

Examples of possible lactones for the polyesters on which the radical $X^1$ is based are γ-butyrolactone, ν-valerolactone, ε-caprolactone, 7-hydroxyhexanoic acid lactone and 8-hydroxyoctanoic acid lactone, which can undergo polyaddition to give polyesters in a manner which is known per se.

Examples of possible hydroxycarboxylic acids for the polyesters on which the radical $X^1$ is based are β-hydroxypropionic acid, γ-hydroxybutyric acid, ν-hydroxyvaleric acid, ε-hydroxycaproic acid, 7-hydroxyhexanoic acid and 4-hydroxy-cyclohexanecarboxylic acid, which can be condensed to give polyesters in a manner which is known per se.

Preferred suitable polyether radicals X are those of the general formula (II)

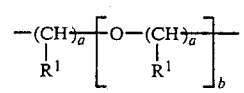

in which
the radicals $R^1$ are in each case identical or different and independently of one another denote H or $C_1$–$C_4$-alkyl radicals, preferably H or $CH_3$, a represents an integer from 2 to 10, preferably 2 or 4, and b denotes an integer from 2 to 350, in particular from 3 to 250.

Examples of these are poly-(ethylene oxide)-glycols, poly-(1,2-propylene oxide)-glycols, poly-(1,3-propylene oxide)-glycols, poly-(1,2-butylene oxide)-glycols, poly-(tetrahydrofuran)-glycols, the corresponding poly-(pentylene oxide)-glycols, poly-(hexamethylene oxide)-glycols, poly-heptamethylene oxide)-glycols, poly-(octamethylene oxide)-glycols and poly-(nonamethylene oxide)-glycols, and copolymers or block copolymers of, for example, ethylene oxide and propylene oxide. Preferred polyether radicals X are those based on ethylene oxide and/or propylene oxide.

The compounds of the structural formula (I), which contain carbonate groups, are prepared by reacting the above polyesters containing OH end groups and polyethers with bis-aryl carbonates of the formula (III)

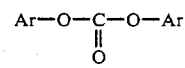

wherein
Ar is a substituted or unsubstituted aryl radical with 6 to 18 C atoms, possible substituents being, in particular, $C_1$–$C_4$-alkyls, and nitro or halogen groups,
or with bis-arylcarbonates of the formula (IV)

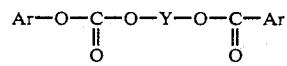

wherein
Y has the meaning of X and $X^1$ in formula (I) or denotes a polyester or polyether containing carbonate groups and having the recurring structural unit (I).

The reaction is usually carried out at temperatures from 110° to 200° C. in the presence of trans-esterification catalysts, such as, for example, alkali metal or alkaline earth metal phenolates, alkali metal or alkaline earth metal alcoholates, tertiary amines, such as, for example, triethylenediamine, morpholine, pyrrolidone, pyridine or triethylamine, or metal compounds, such as antimony trioxide, zinc chloride, titanium tetrachloride and tetrabutyl titanate, the catalyst preferably being employed in amounts of between 20 ppm and 200 ppm, based on the total weight of the reaction components.

Such reaction products are known and are described, for example, in DOS (German Published Specification) No. 2,732,718 or in DOS (German Published Specification) No. 2,712,435 and DOS (German Published Specification) No. 2,651,639.

The limiting viscosity [η] is measured in tetrahydrofuran at 25° C. and is given in dl/g (for the definition, see, for example, H. G. Elias "Makromoleküle" (Macromolecules), Hüthig & Wepf Verlag, Basle, page 265).

C. The polymer alloys to be used according to the invention can be prepared by mixing the cellulose esters or mixed cellulose esters with the higher molecular weight aliphatic compounds. The mixture can then be homogenised at temperatures up to 200° C. on roll mills, taken off as rough sheet and comminuted for further processing. Mixing can also be effected in kneaders and the product can be discharged as extruded material or as a material of any desired shape.

In a particular embodiment, the components of the mixture are alloyed and homogenised on single-screw or multi-screw mixing extruders with a downstream granulating device. Care should be taken here that the extruder screws are designed such that good mechanical mixing is achieved. The highly plasticising effect of the higher molecular weight aliphatic compounds also means that the alloys to be used according to the invention can be prepared at relatively low temperatures (140° to 180° C.), products which are not discoloured being obtained.

The polymer alloys to be used according to the invention can also be prepared by dissolving the components of the mixture in suitable solvents or solvent mixtures and then evaporating off the solvents. The solvent can be evaporated off either by casting a film and evaporating off the volatile solvents under normal pressure or in vacuo at temperatures of 0° to 220° C., or by evaporation by means of degassing extruders.

Examples of suitable solvents which may be mentioned are: ketones, such as acetone, methyl ethyl ketone, cyclohexanone or diethyl ketone, esters, such as methyl acetate, ethyl or butyl acetate or methyl formate, ethers, such as diethyl ether, the methyl, ethyl, propyl or butyl ethers of ethylene glycol or diethylene glycol, or tetrahydrofuran, amides, such as dimethylformamide or diethylformamide, chlorinated hydrocarbons, such as methylene chloride, chloroform, carbon tetrachloride, dichloroethane or dichloroethylene, or substituted or unsubstituted aromatic solvents, such as benzene, toluene, xylene, chlorobenzene, dichlorobenzene, nitrobenzene, anisole, phenol or cresol.

The polymer alloys to be used according to the invention can be processed by the normal methods for processing thermoplastics, for example by injection moulding, extrusion, pressing between forces or blow-moulding to films.

The polymer alloys can be injection-moulded or pressed directly to lenses.

Pressing to contact lenses for the eye is thereby effected by conventional processes, by injection-moulding in moulds, by centrifugal casting in moulds, by punching or stamping from films, or by pressing between two quartz forces. However, it is also possible first to produce blanks and to machine these and then polish them. The semi-hard to soft optical contact materials which can be obtained have a water absorption capacity of about 2% by weight.

The semi-hard to soft contact lenses according to the invention are distinguished by their good comfort during wear and by their physiological inertness. Since they absorb only a small amount of water, they accumulate neither bacteria, spores or fungi nor metabolism products and sterilising agents. They contain no low molecular weight additives which could migrate and damage the eye. It is not necessary to use vulcanisation auxiliaries or fillers. The good wettability with lachrymal fluid and the low tendency towards deposition or absorption of lipoids to be singled out.

D. The preparation of some of the polyester(ether)-carbonates suitable for the polymer alloys to be used according to the invention is described below.

(A) 1,000 parts by weight of a linear polyether of ethylene glycol units having an average molecular weight Mn of 608 (determined by measuring the OH number), 334.8 parts by weight of diphenyl carbonate and 0.1 part by weight of sodium phenolate are stirred at temperatures between 160° and 190° C. for 1 hour. The volatile polycondensation products formed, in particular phenol, are then distilled off under a vacuum of 1.5 mm Hg. The temperature is increased to 190° C. for 4 hours, whilst continuing the distillation. A viscous, elastic mass with a limiting viscosity [η], measured in tetrahydrofuran (THF) at 25° C., of 0.238 and a molecular weight of ~5,000 g/mole (determined by vapour pressure osmosis) is thereby obtained.

(B) 1,000 parts by weight of a linear polyethylene glycol with an average molecular weight Mn of 608 and an OH number of 184, 358 parts by weight of diphenyl carbonate, 0.1 part by weight of sodium phenolate and 1.2 parts by weight of dilauryl dithiopropionate (Irganox ® PS 800) are treated as described under Example A). A rubber-like, resilient mass with a limiting viscosity [η] of 0.642 (measured in tetrahydrofuran (THF) at 25° C.) is thereby formed.

(C) 300 parts by weight of a polyester-diol, of average molecular weight Mn 2,000 (determined by measurement of the OH number), obtained from adipic acid and a mixture of n-hexane-1,6-diol/neopentylglycol in a ratio of 65:35, 700 parts by weight of a linear polyether with an average molecular weight Mn of 608 (determined by measurement of the OH number), 286.4 parts by weight of diphenyl carbonate, 0.1 part by weight of sodium phenolate and 1.2 parts by weight of Irganox ® PS 800 are stirred at 185° C. for 1 hour, and the volatile condensation products, in particular phenol, are then distilled off under a vacuum of 1.5 mm Hg at 185° C. in the course of 5 hours, while stirring. The product is a highly elastic rubber with a limiting viscosity [η] of 2.21 (measured in THF at 25° C.).

(D) 1,000 parts by weight of a polyester-diol, of average molecular weight Mn of 2,000, obtained from adipic acid and a mixture of n-hexane-1,6-diol/neopentylglycol in a ratio of 65:35, 170 parts by weight of diphenyl carbonate, 0.1 part by weight of sodium phenolate and 1.2 parts by weight of Irgano ® PS 800 are treated like the reaction components in Example C). After the reaction, a polyester containing carbonate groups and terminal OH groups and having an average molecular weight Mn of 3,600 and a limiting viscosity [η] of 0.192 is obtained.

(E) 420.4 parts by weight of the reaction product from Example A) and 123.2 parts by weight of the reaction product from Example D) are warmed to 140° C., while stirring. A vacuum of 0.1 mm Hg is then applied and the phenol formed is distilled off, while stirring and warming to 185° C. After a reaction time of 4 hours, a polyether-ester containing carbonate groups and having an average molecular weight Mn of 9,300 and a limiting viscosity [η] of 0.61, measured as in Example A), is obtained.

(F) 1,000 parts by weight of a polyester-diol, of average molecular weight Mn 2,000 (determined by measurement of the OH number), obtained from adipic acid and a mixture of n-hexane-1,6-diol/neopentylglycol in a weight ratio of 65:35, 115.1 parts by weight of diphenyl carbonate and 0.1 part by weight of sodium phenolate are stirred at 150° C. under a nitrogen atmosphere for 1 hour, and a vacuum is then applied and the temperature is increased to 185° C. The volatile condensation products, in particular phenol, thereby distil off, and the vacuum can be reduced to 0.4 mm Hg as the reaction progresses. After a reaction time of 5 hours, the mixture is gassed with nitrogen. The product is a slightly yellow resilient mass with a limiting viscosity [η] of 1.07 (measured in THF at 25° C.).

(G) 500 parts by weight of a polyester-diol of average molecular weight Mn 2,000, obtained from adipic acid and a mixture of hexane-1,6-diol/neopentylglycol in a ratio of 65:35, 500 parts by weight of a linear polyether of ethylene glycol units with a molecular weight of 608, 238.6 parts by weight of diphenyl carbonate, 0.1 part by weight of Na phenolate and 1.2 parts by weight of dilauryl thiodipropionate are covered with a layer of nitrogen in a reaction vessel and warmed to 180° C., while stirring, the mixture is then subjected to a condensation reaction at 180° C. for 1 hour and the volatile condensation products are then distilled off in vacuo by increasing the temperature to 190° C. in the course of 1 hour. The product is a solid wax with a limiting viscosity [η] of 0.861 (measured in THF at 25° C.).

(H) 948.5 parts by weight of a linear polyether of ethylene glycol units with an average molecular weight Mn of 608, 351 parts by weight of diphenyl carbonate and 0.1 part by weight of Na phenolate are stirred at 160° to 190° C. for 1 hour. A vacuum of 1.5 mm Hg is then applied and the phenol formed is distilled off. After distillation for 4 hours, no further volatile condensation products escape. The reaction vessel is now gassed with nitrogen, and 160 g of a polyester-diol, of average molecular weight Mn 2,000, obtained from adipic acid and a mixture of hexane-1,6-diol/neopentylglycol in a ratio of 65:35 are added to the mixture. The mixture is evacuated again and the phenol is distilled off at 190° C. in the course of 3 hours. The product is a very highly viscous oil with a limiting viscosity [η] of 0.54 (measured in THF at 25° C.).

(I) 6,716 parts by weight of a polyester-diol of average molecular weight Mn 2,000, obtained from adipic acid and a mixture of hexane-1,6-diol/neopentylglycol in a weight ratio of 65:35, 720 parts by weight of diphenyl carbonate and 0.24 part by weight of sodium phenolate are warmed to 130° C., while stirring, in a stirred kettle which is filled with nitrogen and equipped with a distillation bridge. The internal pressure of the reactor is then reduced, whereupon phenol distils off. After 1 hour, a pressure of 1 mbar is reached, and the temperature is increased. The mixture is now stirred in vacuo at 150° C. for 1 hour, at 175° C. for 3.5 hours and then at 180° C. for 2 hours. A rubber-like plastic with a limiting viscosity [η] of 0.99 dl/g, measured in THF at 25° C., is obtained.

Other high molecular weight compounds containing ester or carbonate groups which are suitable for the preparation, according to the invention, of polymer alloys are:

(K) a polyester of molecular weight (Mn) 11,500 prepared by condensation of adipic acid and butane-1,4-diol; and (L) a polycarbonate of molecular weight (Mn) 10,700 prepared by condensation of hexane-1,6-diol and diphenyl carbonate.

Preparation of the contact lens material

A cellulose acetobutyrate (CAB) having the composition: 37% by weight of butyryl groups, 15% by weight of acetyl groups and 0.8% by weight of hydroxyl groups, and a cellulose acetopropionate (CAP) of the composition: 49% by weight of propionyl groups, 2% by weight of acetyl groups and 1.6% by weight of hydroxyl groups, were used.

The higher molecular weight compounds (F), (G), (I), (K) and (L) were mixed with CAB and CAP in the ratios shown in Table 1 in a twin-screw extruder at a barrel temperature of 160°–170° C. and the mixture was granulated.

The granules thus prepared were pressed to contact lenses by a melting/pressing process between quartz forces at 180° C. with a pressing time of 1 hour. The contact lenses were completely formed, and were easily detached from the quartz glass tool. When the lenses were converted into the hydrated state, a slight increase in curvature was found, but this did not change further. Measurement of the inner radii in the hydrated state over a period of 14 days showed variations of less than 0.02 mm. Testing of the lenses using a slit lamp showed an excellent optical pattern. No striations or cloudiness were to be seen, and the transparency to light was ≧97%. Compared with commercially available lenses of a cellulose acetobutyrate/polyethylene/co-vinyl acetate blend, the materials exhibited noticeably less light scattering. Testing on the rabbit eye demonstrated the good tolerance. After 30 days of uninterrupted wear, no corneal vascularisation was observed.

TABLE 1

| Example | Parts by weight of polyhydroxy compound | Parts by weight of CAB | Parts by weight of CAP |
|---|---|---|---|
| 1 | F 10 | 90 | — |
| 2 | G 15 | 85 | — |
| 3 | I 8 | 92 | — |
| 4 | F 10 | — | 90 |
| 5 | K 5 | 95 | — |
| 6 | L 10 | 90 | — |

What is claimed is:

1. Contact lenses prepared from a polymer alloy essentially free from plasticizers and which comprises
   (A) 97–70% by weight of one or more cellulose esters of one or more aliphatic carboxylic acids, and
   (B) 3–30% by weight of an aliphatic polymeric compound having ester moieties, carbonate moieties or both ester and carbonate moieties in the polymer chain and having an average molecular weight of 2,000 to 300,000, with less than 2% by weight of compounds having a molecular weight below 500.

2. Contact lenses according to claim 1 consisting essentially of a polymer alloy of
   (A) 95–85% by weight of cellulose ester, and
   (B) 5–15% by weight of the aliphatic polymer compound.

3. Contact lenses according to claim 1 or 2 wherein the polymer alloy contains less than 1% by weight, preferably less than 0.5% by weight, of compounds with a molecular weight below 1,000.

4. Contact lenses according to claim 1 or 2 wherein the polymer alloy contains less than 1% by weight of compounds with a molecular weight below 500.

5. Contact lenses according to claim 1 or 2 wherein component (A) of the polymer alloy is
   (i) cellulose acetobutyrate containing 30 to 50% by weight of butyric moieties, 10 to 26% by weight of acetic moieties and 0.7 to 1.45% by weight of hydroxyl moieties, or
   (ii) cellulose acetopropionate containing 30 to 63.5% by weight of propionic moieties, 1 to 12% by weight of acetic moieties and 1.2 to 1.45% by weight of hydroxyl moieties.

6. Contact lenses according to claim 1 or 2 wherein component (B) of the polymer alloy has a molecular weight of 4,000 to 200,000.

7. Contact lenses according to claim 1 or 2 wherein component (B) of the polymer alloy is a polyester, polycarbonate or polyether-ester.

8. Contact lenses according to claim 7, characterized in that the polyester component is prepared from adipic acid or carbonic acid and butane-1,4-diol, hexane-1,6-diol, neopentylglycol or a mixture of diols and the polyether component is prepared from ethylene oxide, propylene oxide or a mixture thereof.

9. Contact lenses according to claim 1 or 2 wherein component (B) of the polymer alloy is a polyester(ether)-carbonate with recurring structural units of the formula

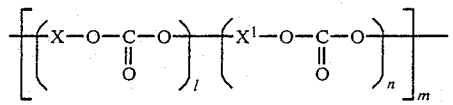

wherein each
   $X^1$ is the same or different and is an aliphatic polyester moiety with a molecular weight of 200 to 6,000,
   each X has the same meaning of $X^1$ or is the same or different aliphatic polyether moiety with a molecular weight of 200 to 20,000,
   n is zero or an integer from 1 to 20,
   l is an integer from 1 to 20, and
   m is an integer of at least 20, and wherein the limiting viscosity of component (B) in tetrahydrofuran is about 0.5–2.5 dl/g.

* * * * *